US008509819B2

(12) United States Patent
Tanaka et al.

(10) Patent No.: US 8,509,819 B2
(45) Date of Patent: Aug. 13, 2013

(54) INFORMATION PROCESSING APPARATUS AND CORRECTION METHOD

(75) Inventors: Hideki Tanaka, Kawasaki (JP); Shinichi Shiotsu, Kawasaki (JP); Hiroyasu Sugano, Koto (JP); Koichi Yokota, Yokohama (JP); Akira Itasaki, Yokohama (JP); Daisuke Yamashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/476,280

(22) Filed: May 21, 2012

(65) Prior Publication Data
US 2012/0309336 A1 Dec. 6, 2012

(30) Foreign Application Priority Data

May 31, 2011 (JP) .................. 2011-122464

(51) Int. Cl.
*H04W 24/00* (2009.01)
*G01S 3/02* (2006.01)
(52) U.S. Cl.
USPC ...................... 455/456.6; 342/458
(58) Field of Classification Search
USPC .......... 455/456.6, 456.1, 422.1, 67.11, 67.16; 342/118, 126, 450, 458
See application file for complete search history.

(56) References Cited

U.S. PATENT DOCUMENTS

| 7,519,372 | B2 | 4/2009 | MacDonald et al. |
| 7,881,720 | B2 | 2/2011 | Huang et al. |
| 2009/0005063 | A1* | 1/2009 | Malik et al. ................. 455/456.1 |
| 2009/0221299 | A1 | 9/2009 | MacDonald et al. |

FOREIGN PATENT DOCUMENTS

| JP | 11-218571 | 8/1999 |
| JP | 2007-068163 | 3/2007 |
| JP | 2010-160158 | 7/2010 |
| JP | 2010-232920 | 10/2010 |

* cited by examiner

*Primary Examiner* — Nguyen Vo
(74) *Attorney, Agent, or Firm* — Fujitsu Patent Center

(57) ABSTRACT

An information processing apparatus includes an acquiring unit configured to receive signals, which are transmitted from a fixed station, including identification information for identifying the fixed station, measure receive signal strength indications of the received signals, and acquire position information indicating positions at which the receive signal strength indications are measured, the receive signal strength indications, and the identification information in association with each other; and a gain/attenuation rate calculating unit configured to calculate correction information including a transmission antenna gain in a specific direction from the fixed station and an attenuation rate in a propagation path, the correction information being obtained from the receive signal strength indication measured at a first distance in the specific direction from the fixed station and the receive signal strength indication measured at a second distance in the specific direction that is different from the first distance.

7 Claims, 12 Drawing Sheets

FIG.3

| FIXED STATION INITIAL INFORMATION 331 | | | | | FIXED STATION CORRECTION INFORMATION 332 | | | |
|---|---|---|---|---|---|---|---|---|
| FIXED STATION NAME | POSITION COORDINATES | | | TRANSMISSION POWER (Ptx) | ANGLE INFORMATION | TRANSMISSION ANTENNA GAIN (Gtx) | ATTENUATION RATE (n) | WHETHER PRIOR MEASUREMENT IS PERFORMED |
| | X | Y | Z | | | | | |
| AP1 | xxx1 | yyy1 | zzz1 | +10dBm | 0° | −5dB | 2.5 | YES |
| | | | | | 22.5° | − | − | NO |
| | | | | | 45° | −10dB | 3.0 | YES |
| | | | | | 67.5° | − | − | NO |
| | | | | | 90° | 0dB | 2.5 | YES |
| | | | | | 112.5° | − | − | NO |
| | | | | | 135° | −10dB | 2.6 | YES |
| | | | | | 157.5° | − | − | NO |
| | | | | | 180° | −5dB | 2.1 | YES |
| | | | | | 202.5° | − | − | NO |
| | | | | | 225° | −40dB | 2.5 | YES |
| | | | | | 247.5° | − | − | NO |
| | | | | | 270° | −50dB | 2.7 | YES |
| | | | | | 292.5° | − | − | NO |
| | | | | | 315° | −40dB | 2.2 | YES |
| | | | | | 337.5° | − | − | NO |
| ... | ... | ... | ... | ... | ... | ... | ... | ... |

INFORMATION PROCESSING APPARATUS AND CORRECTION METHOD

CROSS-REFERENCE TO RELATED APPLICATION

This patent application is based upon and claims the benefit of priority of the prior Japanese Patent Application No. 2011-122464 filed on May 31, 2011, the entire contents of which are incorporated herein by reference.

FIELD

The embodiments discussed herein are related to an information processing apparatus and a correction method for efficiently acquiring correction information for performing positioning appropriately.

BACKGROUND

Conventionally, for identifying the position of a terminal device (hereinafter, "terminal") including a function for performing wireless communication, a method using RSSI (Receive Signal Strength Indication) is used. Conventionally, for example, first, the RSSI from plural fixed stations (for example, at N points) located around the terminal are measured, and the RSSI values are converted into distances, so that the distances between the respective fixed stations and the terminal are acquired. Subsequently, the position where the terminal is located is determined by combining the distances from the plural fixed stations.

Furthermore, conventionally, there is the following technology estimating the position of a mobile station by triangulation using distances obtained with RSSI from plural base stations. Specifically, the position of the mobile station is estimated using RSSI of two or more positions, the transmission power and the antenna gain are known, and the attenuation tilt of the distance to the propagation path (attenuation rate) that is not known is obtained by RSSI measurement. Furthermore, conventionally, there is a technology of creating an RSSI map by measuring RSSI of one or more (plural) receiving points using the base station, and calculating the environmental impact (including the distance to attenuation amount) of a propagation path attenuation model. Furthermore, conventionally, there is a technology of obtaining the distance between a wireless terminal to a base station, using base station information including transmission power and an antenna gain, RSSI of the wireless terminal received from the base station, and a predetermined estimate equation of propagation loss such as the "Okumura-Hata Model". Furthermore, conventionally, there is a technology of obtaining the relationship between the electric field strength (RSSI) and the distance by sequentially changing the distance to the mobile station from the fixed station (for example, by bringing the mobile station closer by 5 m), and obtaining the distance by measuring the electric field strength from three or more fixed stations, to detect the position of a mobile station (see, for example, patent documents 1 through 4).

Patent document 1: Japanese Laid-Open Patent Publication No. 2010-160158
Patent document 2: Japanese Laid-Open Patent Publication No. 2007-68163
Patent document 3: Japanese Laid-Open Patent Publication No. 2010-232920
Patent document 4: Japanese Laid-Open Patent Publication No. 11-218571

However, as described above, when positioning (identifying the position of) a positioning target object such as a terminal by using RSSI of radio waves from plural fixed stations (for example, at N points), the transmission power of a fixed station whose position is registered in advance may change due to the environment. Therefore, conventionally, the accurate distance to the terminal may not be obtained, and errors may arise in the positioning results.

The RSSI to a terminal that is located at a communication distance d from a fixed station is obtained by the following formula (1).

$$RSSI = Ptx + Gtx - Loss\_d + Grx \quad (1)$$

In the above formula (1), Ptx indicates the transmission power at the fixed station (access point), Gtx indicates the transmission antenna gain at the fixed station, Loss_d indicates the loss of space in the communication distance d, and Grx indicates the reception antenna gain at the terminal. Furthermore, the transmission power Ptx and the transmission antenna gain Gtx are parameters unique to a fixed station, the loss of space Loss_d is a parameter determined by a distance, and the reception antenna gain Grx is a parameter unique to a terminal.

The terminal acquires the RSSI and substitutes, into the above formula (1), the acquired RSSI, the transmission power Ptx, the transmission antenna gain Gtx, and the reception antenna gain Grx, and calculates the loss of space Loss_d. Furthermore, the terminal acquires the distance to the fixed station based on the loss of space Loss_d obtained as a result of the calculation. Furthermore, the terminal acquires the above difference from three different fixed stations to identify the position of itself.

The parameters unique to a fixed station described above may change due to the direction (angle) of the fixed station and the installation method of the fixed station (for example, the distance from a wall). Similarly, the parameter that is determined by a distance may change due to the environment of the propagation space (for example, when it is raining or when there is a radio disturbance due to an obstacle). For example, the loss of space Loss_d in the above formula (1) that is a parameter that is determined by a distance may be obtained by the following formula (2).

$$\text{loss of space } Loss\_d = 10 \log(4\pi d/\lambda)^n \quad (2)$$

In the above formula (2), $\lambda$ is the wavelength of the radio wave in the space, and n is the attenuation rate in the propagation path. The attenuation rate in formula (2) is square (n=2) in a free space; however, this value (the attenuation rate) increases in an environment that is affected by reflection.

Furthermore, the above parameter unique to a terminal may change according to the direction (angle) of the terminal and the degree of adhesion (how the terminal is being held) between the terminal and a human body.

The transmission power Ptx that is one of the parameters unique to the fixed station is typically determined to be a uniform value by a wireless standard. Furthermore, the wavelength $\lambda$ that is one of the parameters determined by a distance is typically determined to be a uniform value by a wireless standard, and may vary somewhat due to the difference in the channel (ch), although such a difference is negligible. Furthermore, the reception antenna gain Grx that is one of the parameters unique to a terminal may be a value that is set in advance in each terminal.

Therefore, in the formula (1), if the distance d from the fixed station is determined, there are only two unknown variables, i.e., the transmission antenna gain Gtx and the attenuation rate of loss of space n.

However, in the above patent documents 1 through 4, there are no processes for correcting the two unknown variables described above, and therefore it is not possible to efficiently acquire correction information for performing positioning appropriately.

SUMMARY

According to an aspect of the present invention, an information processing apparatus includes an acquiring unit configured to receive signals, which are transmitted from a fixed station, including identification information for identifying the fixed station, measure receive signal strength indications of the received signals, and acquire position information indicating positions at which the receive signal strength indications are measured, the receive signal strength indications, and the identification information in association with each other; and a gain/attenuation rate calculating unit configured to calculate correction information including a transmission antenna gain in a specific direction from the fixed station identified by the identification information and an attenuation rate in a propagation path, the correction information being obtained from the receive signal strength indication measured at a first distance in the specific direction from the fixed station identified by the identification information and the receive signal strength indication measured at a second distance in the specific direction that is different from the first distance, among the measured receive signal strength indications.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 3 illustrates an example of fixed station information;

DESCRIPTION OF EMBODIMENTS

Preferred embodiments of the present invention will be explained with reference to accompanying drawings.

First Embodiment

Figure 1:
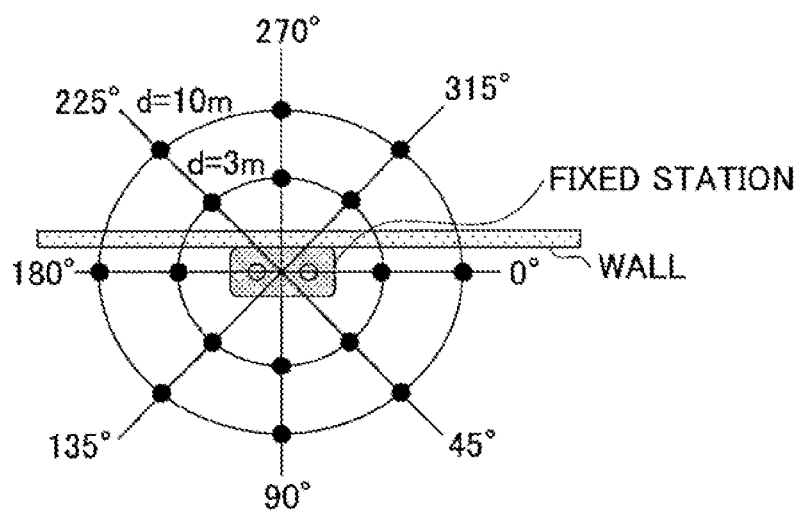
FIG. 1 is for describing an overview of a method of correcting a transmission antenna gain and an attenuation ratio according to a first embodiment.

FIG. 1 is for describing an overview of a method of correcting a transmission antenna gain and an attenuation ratio according to a first embodiment. In the first embodiment, in the above formula (1), if the distance d from the fixed station is determined, there are two unknown variables, i.e., the transmission antenna gain Gtx and the attenuation rate n in the propagation path extending from the terminal to the fixed station. Therefore, in the first embodiment, plural directions to a particular fixed station are set in advance, plural points (for example, two points) set at different distances from the fixed station are set along each of the set directions, and the RSSI (Receive Signal Strength Indication) of each set point is measured by actual measurement. Furthermore, in the first embodiment, based on the measured RSSI values, correction information is generated, including the transmission antenna gain Gtx and the attenuation rate n in the propagation path extending from the terminal to the fixed station.

In the example of FIG. 1, it is assumed that the fixed station (access point) is set on a wall. In the first embodiment, as illustrated in FIG. 1, the directions to be measured are set (for example, 0°, 45°, 90°, 135°, 180°, 225°, 270°, 315° are set, using a particular direction (angle) 0° as a standard). Next, in the first embodiment, terminals for which RSSI is to be measured are positioned at two points located at predetermined distances (for example, d=3 m, 10 m) from the fixed station along each of the set directions, and the RSSI values are measured from the fixed station. The black circles in FIG. 1 indicate the locations for positioning the terminals; however, there may be three or more points instead of two points set for each direction at common distances. Furthermore, the measured RSSI values are substituted into the above formula (1), the transmission antenna gain Gtx and the attenuation rate n are calculated, and correction is performed based on the calculated values. Accordingly, the distance to the fixed station is acquired appropriately.

As for the distances and directions between the terminals and the fixed station, the positions may be identified with the use of map data using a position of the fixed station set in advance as a standard. Alternatively, a GPS (Global Positioning System) function may be used for the terminals and the fixed station to obtain the distances and directions based on the respective position information (latitude and longitude) of the terminals and the fixed station. Furthermore, in the first embodiment, a ranging sensor may be provided in the terminal to measure the distance between the terminal and the fixed station.

The directions described above are not limited to intervals of 45° as illustrated in FIG. 1; the directions may be set arbitrarily such as 5°, 10°, 15°, 30°, 60°, and 90°. The precision increases with smaller intervals.

Furthermore, in the first embodiment, the RSSI of an angle for which the RSSI is not measured may be interpolated with the use of information of nearby angles. For example, in the first embodiment, when the RSSI values of the directions of 45° and 90° from the fixed station are measured, it is possible to create interpolation data of the angle 67.5°, which is the intermediate angle, by performing linear approximation with the use of the respective measurement values.

Examples of a terminal for implementing the above measurement are a mobile phone, a personal digital assistant (PDA), a notebook computer, an electronic book terminal, a music reproduction device, a point of sale (POS) terminal, and a radio; however, the present invention is not so limited. The above fixed station described above is an access point whose position information is registered in a management server for managing one or more fixed stations. The access point is not limited to a fixed station, but may also be a mobile station that is capable of moving.

First Embodiment

System Configuration

Figure 2:
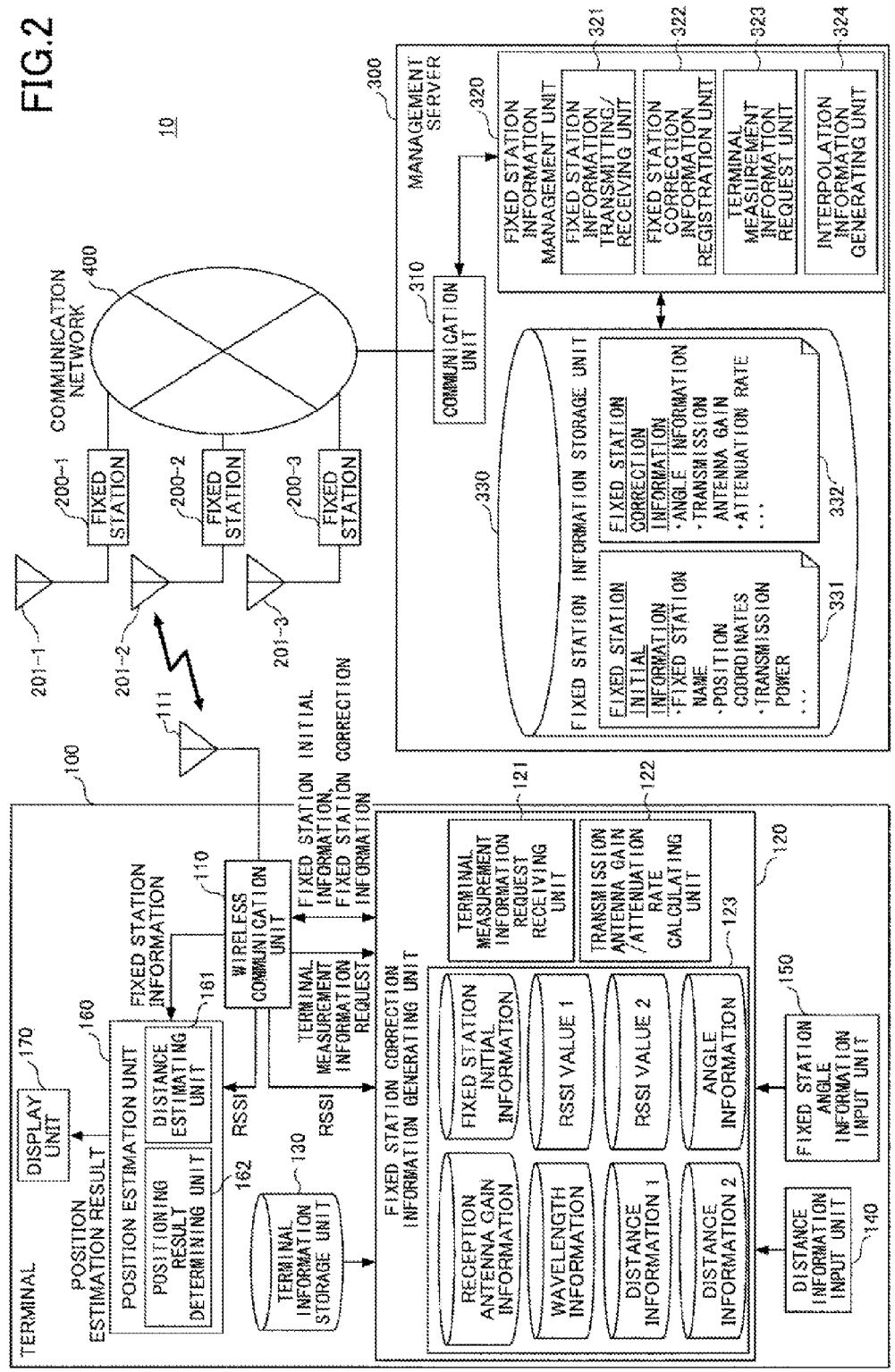
FIG. 2 schematically illustrates a positioning system according to the first embodiment.

Next, a description is given of a system configuration according to the first embodiment, with reference to FIG. 2. FIG. 2 schematically illustrates a positioning system according to the first embodiment. In the example of FIG. 2, the terminal generates the fixed station interpolation information; however, the present invention is not so limited. For example, the fixed station or a management server may create the fixed station interpolation information. Furthermore, in the first embodiment, a single terminal generates the fixed station interpolation information; however, plural terminals may generate the fixed station interpolation information.

A positioning system 10 illustrated in FIG. 2 includes a terminal 100, one or more (in the example of FIG. 2, three) fixed stations 200, and a management server 300. The management server 300 and the respective fixed stations 200-1 through 200-3 are connected by a communication network 400 such as the Internet, and data is exchanged. Meanwhile, the fixed stations 200-1 through 200-3 and the terminal 100 exchange data through radio waves via antennas 201-1 through 201-3 and 111. The present invention is not limited to the above contents, and other communication formats may be used.

First Embodiment

Terminal 100

A detailed description is given of the above-described terminal 100. The terminal 100 includes a wireless communication unit 110, a fixed station correction information generating unit 120, a terminal information storage unit 130, a distance information input unit 140, a fixed station angle information input unit 150, a position estimation unit 160, and a display unit 170.

The wireless communication unit 110 exchanges, via the antenna 111, radio waves with antennas 201-1 through 201-3 provided in the fixed stations 200-1 through 200-3, respectively. The wireless communication unit 110 outputs, to the fixed station correction information generating unit 120, a terminal measurement information request sent from the management server 300.

Furthermore, the wireless communication unit 110 has a function of a measurement information acquiring unit for acquiring RSSI from the fixed stations 200-1 through 200-3. The wireless communication unit 110 outputs the acquired RSSI to the fixed station correction information generating unit 120 and the position estimation unit 160. Specifically, the wireless communication unit 110 outputs the RSSI for a target fixed station (specific fixed station) acquired for generating correction information, to the fixed station correction information generating unit 120. Furthermore, the wireless communication unit 110 outputs RSSI for plural fixed stations (for example, fixed stations 200-1 through 200-3) acquired for identifying the position of the terminal 100, to the position estimation unit 160.

Furthermore, the wireless communication unit 110 outputs the information relevant to the fixed station from which radio waves are received (fixed station information), to the position estimation unit 160. The fixed station information is sent from, for example, the management server 300. When correction information is not yet generated for a fixed station from which RSSI is acquired, fixed station initial information 331 is used as the fixed station information. When correction information is already generated, fixed station correction information 332 is used as the fixed station information.

Furthermore, the wireless communication unit 110 outputs the fixed station initial information 331 acquired from the management server 300, to the fixed station correction information generating unit 120. Furthermore, the wireless communication unit 110 outputs the fixed station correction information 332 obtained from the fixed station correction information generating unit 120, to the management server 300.

That is to say, in the first embodiment, the wireless communication unit 110, etc., are included as an acquiring unit for receiving signals including identification information for identifying the fixed stations 200-1 through 200-3, measuring the RSSI values of the received signals, and associating the position information indicating the measured positions, the RSSI, and the identification with each other.

The fixed station correction information generating unit 120 includes a terminal measurement information request receiving unit 121, a transmission antenna gain/attenuation rate calculating unit 122, and a terminal storage unit 123.

The fixed station correction information generating unit 120 generates fixed station correction information based on a terminal measurement information request sent from the management server 300 and obtained from the wireless communication unit 110, and outputs the generated fixed station correction information to the wireless communication unit 110.

Specifically, in the fixed station correction information generating unit 120, the terminal measurement information request receiving unit 121 receives, from the wireless communication unit 110, a terminal measurement information request for generating correction information for a specific fixed station. The received request information includes a request for generating correction information of a specific angle with respect to a specific fixed station.

The transmission antenna gain/attenuation rate calculating unit 122 is a correction information generating unit for calculating the transmission antenna gain and the attenuation rate. The transmission antenna gain/attenuation rate calculating unit 122 performs a calculation process using the fixed station initial information 331 according to instructions from a user, based on the above terminal measurement information request, or regardless of whether a terminal measurement information request is made.

That is to say, the transmission antenna gain/attenuation rate calculating unit 122 calculates the transmission antenna gain and the attenuation rate at a specific direction (angle), by substituting, into the above formula (1), plural (for example, two) RSSI values acquired based on distance and angle information set in advance for a specific fixed station as illustrated in FIG. 1, and values of transmission power, etc., included in the fixed station initial information 331 of the specific fixed station. Furthermore, the transmission antenna gain/attenuation rate calculating unit 122 generates the fixed station correction information 332 with the use of the calculation results, and outputs the generated fixed station correction information 332 to the wireless communication unit 110.

In the terminal storage unit 123, the fixed station initial information 331 acquired from the management server 300, RSSI values at plural measurement locations (for example, at two measurement locations in the example of FIG. 2 (RSSI value 1, RSSI value 2)), angle information, reception antenna gain information, wavelength information, and plural measurement distance information items (for example, distance information 1, distance information 2) corresponding to the RSSI values, are stored.

In the terminal information storage unit 130, various information items including information relevant to the terminal 100 (for example, a reception antenna gain, wireless standard (wavelength) information), identification information, machine type information, performance, user information, setup information from a user, are stored.

The distance information input unit 140 inputs distance information when measuring the RSSI of the respective fixed stations 200-1 through 200-3. The distance information may be set in advance, and may be arbitrarily set every time the RSSI is measured.

The fixed station angle information input unit 150 inputs the angle information of the fixed stations when measuring the RSSI of the respective fixed stations 200-1 through 200-3. The angle information may be set in advance, and may be arbitrarily set every time the RSSI is measured.

The position estimation unit 160 includes a distance estimating unit 161 and a positioning result determining unit 162. The distance estimating unit 161 estimates the distance from the respective fixed stations 200-1 through 200-3, based on the fixed station information and the RSSI obtained from the wireless communication unit 110. That is to say, the distance estimating unit 161 estimates the distances between the terminal 100 and the respective fixed stations 200-1 through 200-3 based on the RSSI values acquired from the fixed stations.

The positioning result determining unit 162 identifies the position of the terminal 100 based on the intersection of distances from the fixed stations 200-1 through 200-3 that are obtained by the distance estimating unit 161, and determines the positioning result.

The display unit 170 is, for example, a display. The display unit 170 displays position estimation results obtained by the position estimation unit 160. The display unit 170 may have a sound output function, and may output the position estimation result by sound. Furthermore, the display unit 170 may output information other than the position estimation result. For example, the display unit 170 may display the setup information for executing the first embodiment and display the execution results and the execution progression.

The terminal 100 has a function of making measurements to generate the correction information, and a function of making measurements with the use of the correction information. However, in the first embodiment, the terminal 100 is not so limited. For example, the function of making measurements to generate the correction information and the function of making measurements with the use of the correction information may be included in different terminals.

First Embodiment

Management Server 300

Next, a detailed description is given of the above-described management server 300. The management server 300 includes a communication unit 310, a fixed station information management unit 320, and a fixed station information storage unit 330.

The communication unit 310 exchanges data with the fixed stations 200-1 through 200-3 via the communication network 400. Specifically, the communication unit 310 transmits various control signals from the fixed station information management unit 320, and various information items stored in the fixed station information storage unit 330 used for positioning at the terminal 100. Furthermore, the communication unit 310 receives information obtained from the terminal 100 and the fixed stations 200-1 through 200-3, and outputs the received information to the fixed station information management unit 320.

The fixed station information management unit 320 includes a fixed station information transmitting/receiving unit 321, a fixed station correction information registration unit 322, a terminal measurement information request unit 323, and an interpolation information generating unit 324.

The fixed station information management unit 320 manages fixed station information (for example, fixed station initial information and fixed station correction information) for the fixed stations 200-1 through 200-3 that are management targets connected to the communication network 400.

Specifically, in the fixed station information management unit 320, the fixed station information transmitting/receiving unit 321 receives a fixed station information acquiring request from the terminal 100, and transmits the fixed station initial information 331 and the fixed station correction information 332 stored in the fixed station information storage unit 330 to the terminal 100. Furthermore, the fixed station information transmitting/receiving unit 321 receives the fixed station initial information 331 obtained from the fixed stations 200-1 through 200-3 and the fixed station correction information obtained from the terminal 100, and stores the received information in the fixed station information storage unit 330.

The fixed station correction information registration unit 322 registers, in the fixed station information storage unit 330, the fixed station correction information 332 of the fixed stations 200-1 through 200-3 generated by the terminal 100.

When acquiring the fixed station correction information 332 from the terminal 100, the terminal measurement information request unit 323 generates request information for terminal measurement information for the target terminal 100, and transmits the generated request information to the terminal 100 via the communication unit 310. As the request information, for example, a generation request for correction information in a specific fixed station may be used, or a generation request for correction information in a specific angle (direction) of a specific fixed station may be used. Accordingly, for example, in the interpolation information generating unit 324, when it is determined that there is an angle for which it is not possible to generate interpolation information, it is possible to request the terminal 100 to generate the correction information for that angle.

The interpolation information generating unit 324 uses the information of the direction (angle) obtained by actual measurement performed by the terminal 100, to generate interpolation information for interpolating the transmission antenna gain Gtx and the attenuation rate n for the direction (angle) that has not been actually measured. The interpolation information generating unit 324 uses information of nearby angles to generate interpolation information for a specific direction (angle) that has not been measured. Details of the processing contents at the interpolation information generating unit 324 are described below.

The fixed station information storage unit 330 stores various information items for managing the fixed stations 200-1 through 200-3 connected via the communication network 400. That is to say, the fixed station information storage unit 330 holds initial information at the time of installation for each fixed station, and when collecting fixed station correction information obtained from the terminal 100, the fixed station correction information is added and updated.

For example, the fixed station information storage unit 330 includes the fixed station initial information 331 and the fixed station correction information 332. For example, the fixed station initial information 331 includes the name of the fixed station, position coordinates, and transmission power. For example, the fixed station correction information 332 includes angle information, a transmission antenna gain, and an attenuation rate. Contents of the fixed station initial information 331 and the fixed station correction information 332 are not limited to the above. Furthermore, contents stored in the fixed station information storage unit 330 are not limited to the above.

With the above-described configuration of the first embodiment, the transmission antenna gain and the attenuation rate in a space that is the transmission path are measured (actually measured) in an actual environment, so that positioning is performed accurately. Furthermore, in the first embodiment, the precision is increased by measuring a few points, and therefore it does not take time for prior studying.

Furthermore, in the first embodiment, a terminal having a wireless communication function includes a fixed station correction information generating unit that measures the RSSI at plural points (for example, two points) that are set at different distances from the fixed station along a specific direction around the fixed station, and calculates the transmission antenna gain of the fixed station and the attenuation rate in the propagation path. Furthermore, in the first embodiment, for example, the fixed station correction information is stored in the fixed station information storage unit 330 of the management server 300. Furthermore, in the first embodiment, the wireless communication unit 110 of the terminal 100 calculates the distances between the terminal 100 and the respective fixed stations 200-1 through 200-3, based on the RSSI received from the fixed stations 200-1 through 200-3 and the fixed station information to which the fixed station correction information has been added. Accordingly, in the first embodiment, positioning is performed appropriately.

In the above-described positioning system 10, for example, some or all of the functions in the management server 300 may be provided in the fixed station 200. Furthermore, some or all of the functions in the fixed station 200 may be provided in the management server 300. That is to say, the management server 300 and the fixed station 200 may function as, for example, information processing apparatuses. Furthermore, the information processing apparatus may be either the management server 300 or the fixed station 200.

Fixed Station Information

Next, a description is given of the above-described fixed station information according to the first embodiment. FIG. 3 illustrates an example of the fixed station information.

In the fixed station information illustrated in FIG. 3, the fixed station initial information 331 and the fixed station correction information 332 are stored in association with each other. That is to say, in the first embodiment, as the registration information of each fixed station, in addition to the position information (for example, coordinates), the antenna gain and the attenuation properties of each direction set in advance are defined for the corresponding position information.

The fixed station initial information 331 indicated in FIG. 3 includes, for example, the fixed station name (for example, AP1), position coordinates (for example, (X, Y, Z)=(xxx1, yyy1, zzz1)), and the transmission power Ptx (for example, +10 dBm), although not so limited.

Furthermore, the fixed station correction information 332 illustrated in FIG. 3 includes, for example, angle information, the transmission antenna gain Gtx, the attenuation rate, and an indication whether prior measurement is performed (for example, yes/no), although not so limited.

That is to say, transmission antenna gains Gtx and attenuation rates n are measured for every specific angle (for example, 45° in FIG. 3) around the fixed station AP1 using as a standard an angle that is specified in advance (0°), and the measured information is stored for the position coordinates (X, Y, Z) stored as the fixed station initial information 331. The correction information may be calculated by a terminal 100 used for measurement, and may be stored in the fixed station information storage unit 330 of the management server 300. In another example, the correction information may be calculated at the management server 300 and stored in the fixed station information storage unit 330.

When the transmission antenna gain and attenuation rate are obtained from actually measured values, in the field indicating whether prior measurement is performed in the fixed station correction information, identification information indicating that measurement has been performed (for example, "yes") is stored for the corresponding angle. Furthermore, in the example of FIG. 3, the angle information is not measured at the points of 22.5°, 67.5°, 112.5°, 157.5°, 202.5°, 247.5°, 292.5°, or 337.5°. In this case, in the field indicating whether prior measurement is performed in the fixed station correction information, identification information indicating that measurement has not been performed (for example, "no") is stored for the corresponding angles.

Furthermore, in the first embodiment, for an angle for which measurement is not performed, the transmission antenna gain and the attenuation rate are interpolated for the angle information that is not measured, with the use of the transmission antenna gain and the attenuation rate of angle information of plural adjacent angles. For example, when the angle information is 22.5°, the transmission antenna gain and the attenuation rate are calculated based on the transmission antenna gain and the attenuation rate of the angle information of 0° and 45° that has been actually measured. For example, the calculation method is performed to acquire the transmission antenna gain and the attenuation rate of the specific angle and to interpolate the data, by obtaining the average value of two transmission antenna gains and two attenuation rates, or by substituting two values in a function set in advance.

Interpolation Contents

A detailed description is given of the above-described interpolation contents. As described above, in the first embodiment, interpolation information is created for an angle for which prior measurement is not performed, with the use of information of adjacent angles that have been actually measured. In the first embodiment, predetermined conditions may be used to determine whether to create interpolation information by the above methods.

For example, in the first embodiment, a case of determining whether to generate interpolation information for an angle ((a+b)/2) in the middle of an angle a and an angle b at the interpolation information generating unit 324, is considered. In this case, the interpolation information generating unit 324 compares an absolute value of the difference between the correction information (for example, the transmission antenna gain, the attenuation rate, etc.) of the angle a and the angle b with a threshold set in advance, and determines whether to generate interpolation information based on the comparison result.

Specifically, when the above absolute value is greater than the threshold (|correction information (angle a)−correction information (angle b)|>threshold), it is likely that there is an obstacle such as a wall between measurement points, and therefore the interpolation information generating unit 324 does not generate the above interpolation information. When this case applies to a particular angle, for example, information indicating that actual measurement is to be performed is generated and output for this particular angle. Furthermore, when the above absolute value is less than or equal to the threshold, the interpolation information generating unit 324 calculates the average value ((correction information (angle a)+correction information (angle b))/2) of the correction information of the angle a and angle b, and generates interpolation information for the intermediate angle of the angle a and the angle b based on the calculation result.

As to the above threshold, a threshold set in advance is held in the interpolation information generating unit 324 of the management server 300. In the first embodiment, when deriving the transmission antenna gain, it is assumed that the threshold is 10 dB. The transmission antenna gain values of the angles 0° and 45° are compared, and when the difference is greater than or equal to 10 dB, it is determined that there may be an obstacle between the directions of the angles 0° and 45° which is causing this large difference. In this case, as for the transmission antenna gain at 22.5° which is the intermediate angle of the angles 0° and 45°, information indicating that actual measurement is to be performed is generated and output. Furthermore, when the difference between the above absolute values is less than the threshold, interpolation information is generated for the transmission antenna gain and the attenuation rate for the angle 22.5°, and the values are set based on the generated interpolation information.

Accordingly, accurate correction data is acquired without spending time and effort for actual measurement.

Figure 4A:
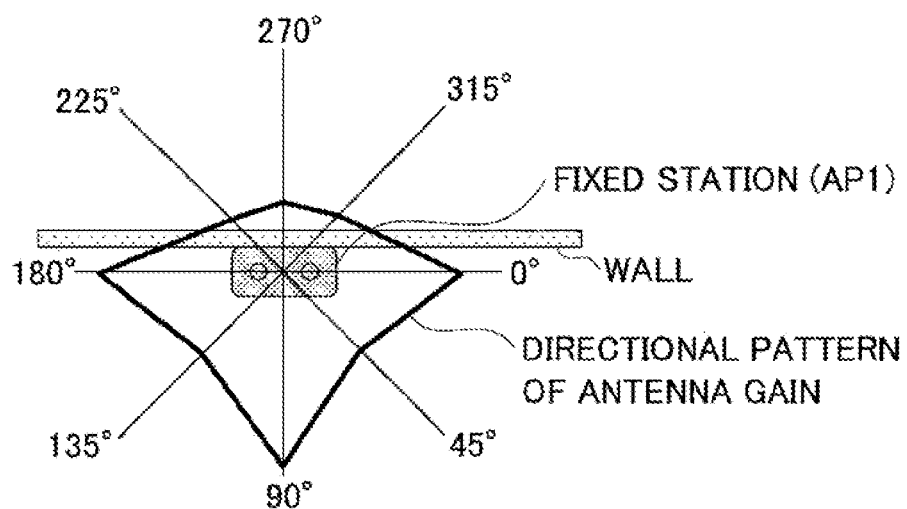
FIGS. 4A and 4B illustrate directional patterns of an antenna gain generated based on fixed station correction information.
Figure 4B:
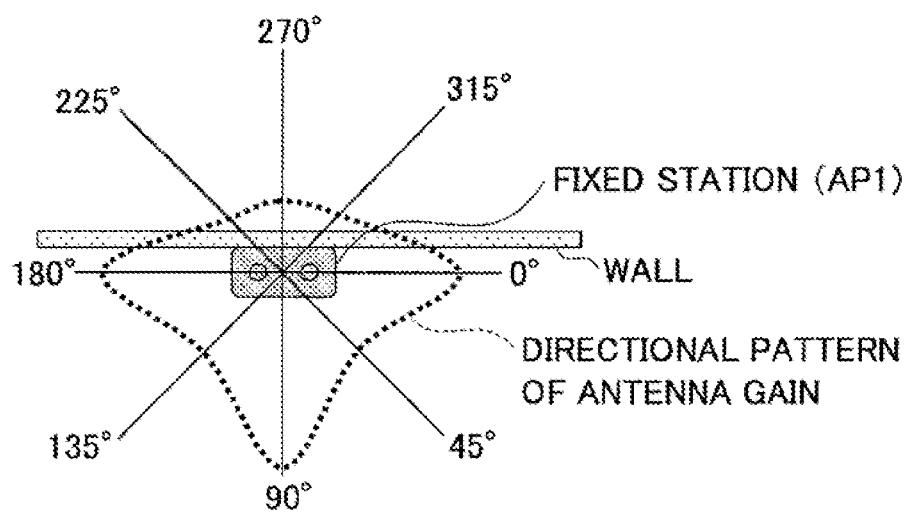

Example of Directional Pattern of Antenna Gain Generated Based on Fixed Station Correction Information FIGS. 4A and 4B illustrate directional patterns of an antenna gain generated based on fixed station correction information. In the examples of FIGS. 4A and 4B, similar to FIG. 1, a certain fixed station (for example, AP1) is provided on a wall. Furthermore, in the examples of FIGS. 4A and 4B, the directional patterns of a corrected antenna gain are set, based on the above-described fixed station correction information 332 according to the present embodiment. The number of angles (directions) and the range of angles measured in the first embodiment are arbitrary. In the examples of FIGS. 4A and 4B, eight directions and the entire circumferential range (360°) are measured; however, the present invention is not so limited. For example, four directions and the range of 0° to 180° may be measured.

FIG. 4A illustrates an example of an antenna gain pattern in which interpolation information is interpolated by linear interpolation. FIG. 4B illustrates an example of an antenna gain pattern in which interpolation information is interpolated by spline interpolation. Furthermore, the antenna gain patterns of both FIGS. 4A and 4B are generated based on data in the fixed station correction information 332 illustrated in FIG. 3.

In the example of FIG. 4A, information set by actual measurement is output for 0°, 45°, 90°, 135°, 180°, 225°, 270°, and 315°. Furthermore, as for the angles between these angles, linear interpolation is performed and the angles are connected by straight lines, so that an antenna gain pattern for the entire circumferential range is generated.

Furthermore, the example of FIG. 4B illustrates an antenna gain pattern calculated with actually measured values for 0°, 45°, 90°, 135°, 180°, 225°, 270°, and 315°, in which the angles between these angles are interpolated by spline interpolation. Spline interpolation is performed by interpolating the sections between adjacent points with values using different formulae (functions, polynomial equations). Therefore, by performing interpolation with the use of a formula set in advance so that the antenna gain pattern becomes continuous through the sections between the values that have been obtained by actual measurement, an appropriate antenna gain pattern is acquired. The above formula of spline interpolation may be set based on antenna gain patterns of different antenna types that have been obtained in the past with measured values, although not so limited.

As illustrated in FIGS. 4A and 4B, in the first embodiment, correction is applied to the operation of positioning the terminal based on the above directional patterns, and therefore an accurate position is estimated.

Example of Positioning Terminal According to First Embodiment

Figure 5:
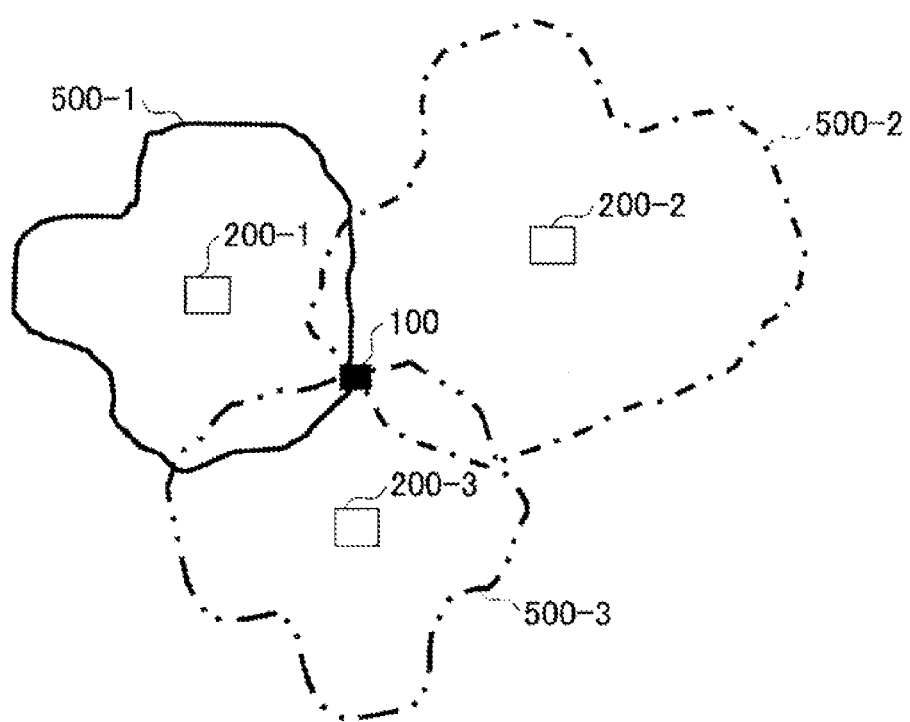
FIG. 5 illustrates an example of positioning a terminal according to the first embodiment.

FIG. 5 illustrates an example of positioning a terminal according to the first embodiment. In the example of FIG. 5, three fixed stations 200-1 through 200-3 are used to perform three-point positioning for estimating the position of the terminal 100. In this case, in the first embodiment, as illustrated in FIG. 5, corrected directional patterns 500-1 through 500-3 respectively corresponding to the fixed stations 200-1 through 200-3 are acquired. For example, these correction information items may be acquired from the management server 300, or may be held by the fixed stations 200-1 through 200-3. Accordingly, the terminal 100 obtains the RSSI by substituting, in the above formula (1), the transmission antenna gains and attenuation rates corresponding to the corrected directional patterns, and estimates an accurate position based on the positions of the RSSI.

Specifically, the terminal 100 calculates the distances from the fixed stations 200-1 through 200-3 by the distance estimating unit 161 of the position estimation unit 160, with the use of the measured values of RSSI and fixed station information corresponding to the RSSI. Furthermore, the terminal 100 acquires the position of the terminal 100 based on the intersection of the distance patterns from the respective fixed stations, by the positioning result determining unit 162 of the position estimation unit 160.

Figure 6:
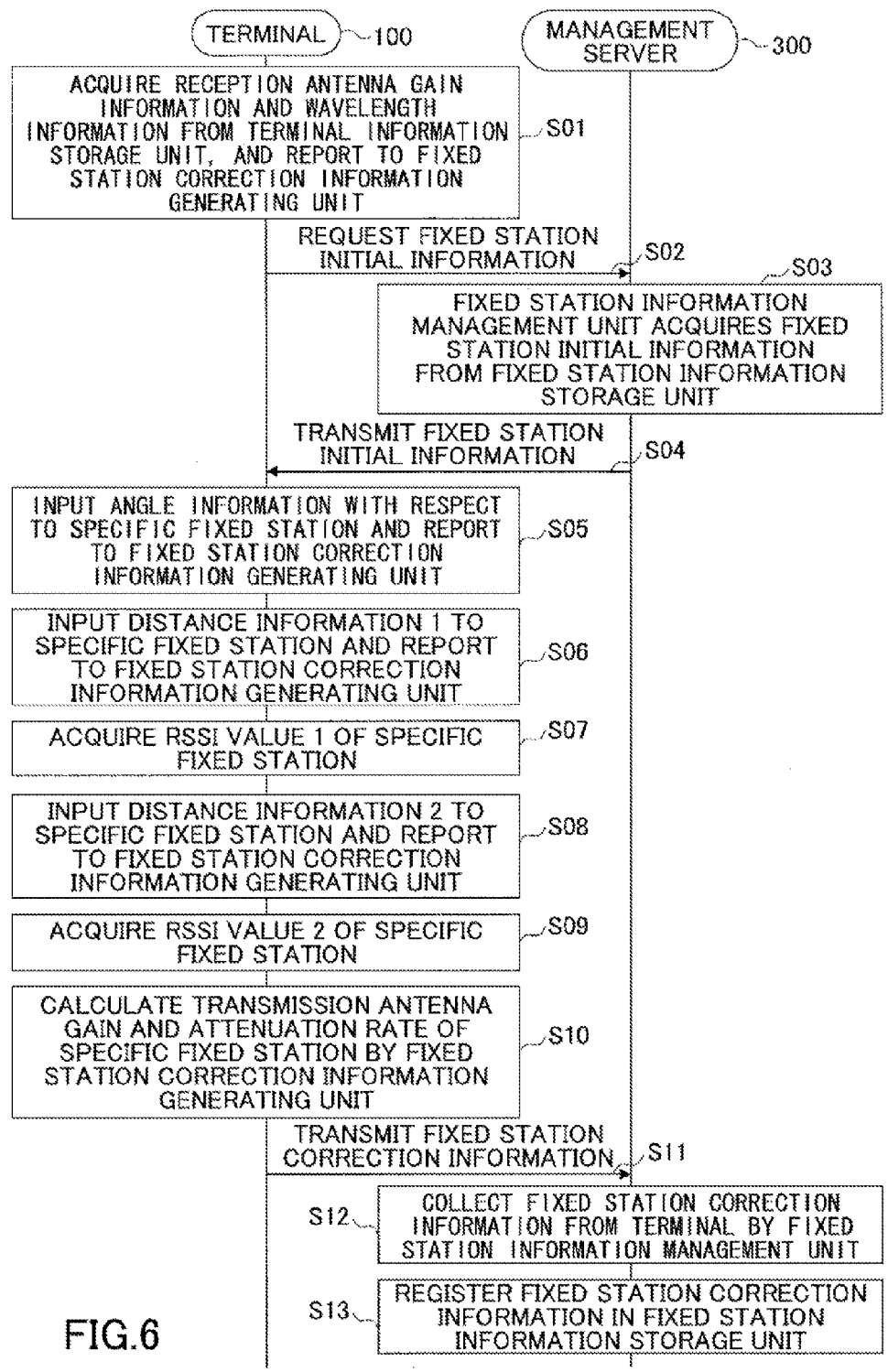
FIG. 6 is a sequence diagram indicating an example of generating the fixed station correction information according to the first embodiment.

Example of Generating Fixed Station Correction Information According to First Embodiment Next, a detailed description is given of an example of generating the above fixed station correction information with reference to a sequence diagram. FIG. 6 is a sequence diagram indicating an example of generating the fixed station correction information according to the first embodiment. FIG. 6 indicates a diagram of a sequence performed by the terminal 100 that performs measurement of the fixed station correction information and the management server 300; however, the terminal 100 and the management server 300 exchanges data via the fixed station 200 and the communication network 400. Furthermore, the process of generating the fixed station correction information according to the first embodiment may be performed after the terminal 100 receives a request from the terminal measurement information request unit 323 of the management server 300, or may be performed by the terminal 100 regardless of whether a request is made.

In the example of FIG. 6, first, the terminal 100 acquires reception antenna gain information and wavelength information from the terminal information storage unit 130, and reports the acquired information to the fixed station correction information generating unit 120 (step S01). Next, the terminal 100 requests the management server 300 to provide the fixed station initial information 331 (step S02).

The fixed station information management unit 320 of the management server 300 acquires the fixed station initial information 331 from the fixed station information storage unit 330 (step S03), and transmits the acquired fixed station initial information 331 to the terminal 100 that made the request (step S04).

The terminal 100 inputs angle information with respect to a fixed station that is a measurement target (specific fixed station) and reports the angle information to the fixed station correction information generating unit 120 (step S05). Furthermore, the terminal 100 inputs the distance to the specific fixed station (distance information 1) from the distance information input unit 140 and reports the distance to the fixed station correction information generating unit 120 (step S06). Furthermore, the terminal 100 acquires the RSSI value (RSSI value 1) of the specific fixed station in the distance information 1 (step S07).

Next, the terminal 100 inputs, from the distance information input unit 140, a distance to the specific fixed station that is different from the distance information 1 (distance information 2), and reports the distance to the fixed station correction information generating unit 120 (step S08). Furthermore, the terminal 100 acquires the RSSI value 2 of the specific fixed station in the distance information 2 (step S09).

Next, the terminal 100 calculates the transmission antenna gain and the attenuation rate of the specific fixed station by the fixed station correction information generating unit 120 (step S10), and transmits the calculated fixed station correction information 332 to the management server 300 (step S11). The calculation in step S10 is performed to obtain the transmission antenna gain and the attenuation rate by substituting, in the above formula (1), the above two distances (distance information 1, distance information 2) and the RSSI values (RSSI value 1, RSSI value 2), and also substituting, in the above formula (1), values set in advance in the other parameters (transmission power, reception antenna gain).

The management server 300 collects, by the fixed station information management unit 320, the fixed station correction information 332 from the terminal 100 (step S12), and registers the collected fixed station correction information 332 in the fixed station information storage unit 330 (step S13).

In the above examples, RSSI values for distances of two points in the same direction are obtained; however, the present invention is not so limited, and there may be three or more points, for example.

That is to say, in the first embodiment, correction is performed for implementing positioning in an efficient and accurate manner by reducing prior measurement; however, the measurement may be performed for three or more points. In the case of using three or more points, the results obtained with the first two points are held in the transmission antenna gain/attenuation rate calculating unit 122, an average value of the held results and calculation results using values measured at a new point is calculated, and the average value is used as the fixed station correction information.

In the first embodiment, the above generation and registration of the fixed station correction information are performed for each fixed station, and therefore the antenna gain pattern and attenuation rate are corrected for each fixed station.

Example of Generating Interpolation Information According to First Embodiment

Figure 7:
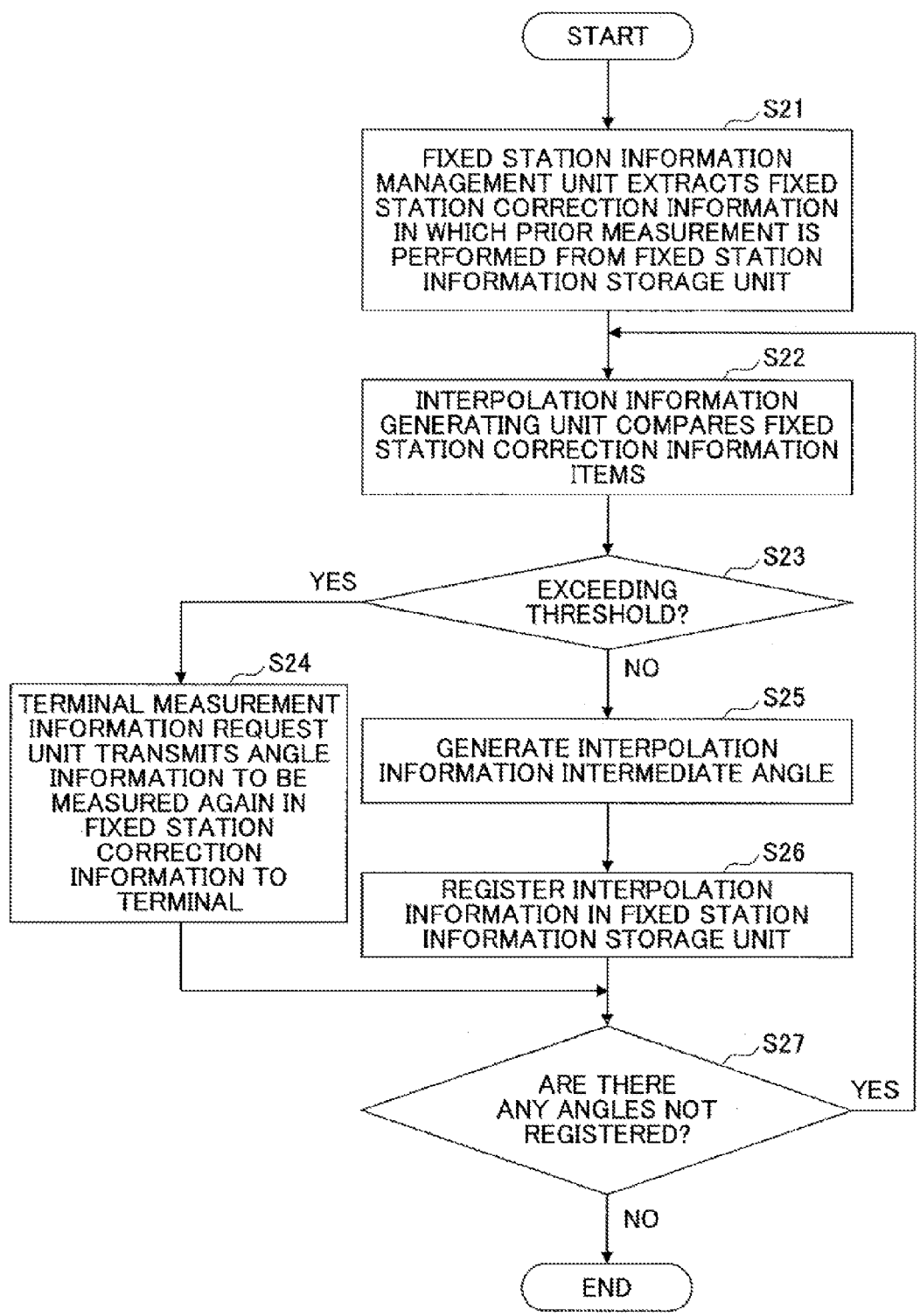
FIG. 7 is a flowchart indicating an example of generating interpolation information according to the first embodiment.

Next, a detailed description is given of an example of generating interpolation information according to the first embodiment with reference to a flowchart. FIG. 7 is a flowchart indicating an example of generating interpolation information according to the first embodiment. In the example of FIG. 7, in the management server 300, the fixed station information management unit 320 extracts fixed station correction information in which prior measurement is indicated as being performed from the fixed station information storage unit 330 (step S21), and the interpolation information generating unit 324 compares the extracted fixed station correction information items (step S22). The interpolation information generating unit 324 determines whether the comparison result exceeds a threshold set in advance as described above (step S23). When the comparison result exceeds the threshold (YES in step S23), the terminal measurement information request unit 323 transmits angle information in the fixed station correction information 332 that is to be measured again to the terminal 100 (step S24). Accordingly, in the first embodiment, the correction information is generated by performing actual measurement at the corresponding angle with the use of the terminal 100.

Furthermore, in step S23, when the comparison result does not exceed the threshold (NO in step S23), the interpolation information generating unit 324 uses the correction information for the two angles obtained by actual measurement to generate interpolation information for an intermediate angle of the two angles as described above (step S25).

Furthermore, the management server 300 registers, in the fixed station information storage unit 330, the interpolation information obtained by the fixed station correction information registration unit 322 in step S25 (step S26). The management server 300 determines whether there are any angles that are not registered after step S24 or step S26 (step S27). It may be determined that an angle is not registered when data items of one or both of the antenna gain information and the attenuation rate are not stored in the angle information of the fixed station correction information, although the present invention is not so limited. For example, in a modification of the first embodiment, a flag indicating registered/not registered may be provided for each angle in the fixed station correction information, and it may be determined whether an angle is registered by referring to the flag.

In the process of step S27, when there is an angle that is not registered (YES in step S27), the process returns to step S22 and subsequent steps are performed for another angle. When there are no angles that are not registered (NO in step S27), the process ends.

In the first embodiment, the above generation and registration of the fixed station correction information are performed for each fixed station, and therefore the antenna gain pattern and attenuation rate are corrected for each fixed station.

Figure 8:
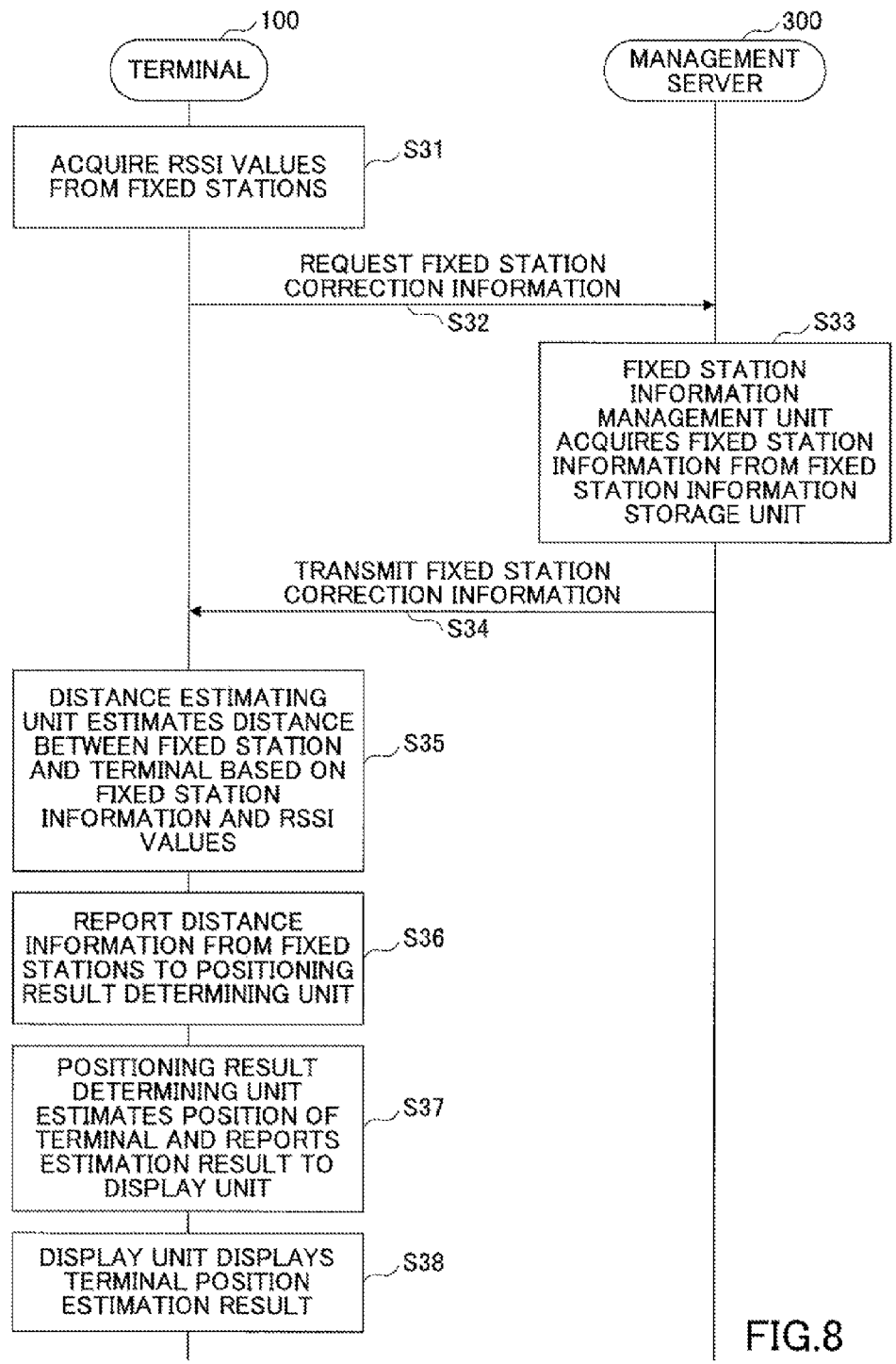
FIG. 8 is a sequence diagram indicating an example of reference to fixed station correction information and a position estimation process according to the first embodiment.

Example of Reference to Fixed Station Correction Information and Position Estimation Process According To First Embodiment Next, a detailed description is given of an example of reference to fixed station correction information and a position estimation process according to the first embodiment with reference to a sequence diagram. FIG. 8 is a sequence diagram indicating an example of reference to fixed station correction information and a position estimation process according to the first embodiment. This process is performed after the above-described fixed station correction information has already been generated.

In FIG. 8, the terminal 100 first acquires RSSI values from the fixed stations (for example, fixed stations 200-1 through 200-3) (step S31). Next, the terminal 100 requests the management server 300 to provide fixed station information of the fixed stations from which the RSSI values have been acquired (step S32).

In the management server 300, the fixed station information management unit 320 acquires fixed station information from the fixed station information storage unit 330 (step S33). In the process of step S33, for a fixed station whose fixed station correction information 332 has already been acquired, the fixed station correction information 332 is used as the fixed station information, and for a fixed station whose fixed station correction information 332 has not been acquired, the fixed station initial information 331 is used as the fixed station information. The management server 300 transmits the fixed station information acquired in step S33 to the terminal 100 that made the request (step S34).

In the terminal 100, the distance estimating unit 161 uses the fixed station information obtained from the management server 300 to estimate the distance between the fixed station and the terminal based on the fixed station information and RSSI values (step S35), and reports the distance information indicating the distance between the terminal 100 and the respective fixed stations to the positioning result determining unit 162 (step S36).

Furthermore, in the terminal 100, the positioning result determining unit 162 estimates the position of the terminal 100 with the use of the distance information indicating the distance between the terminal 100 and the respective fixed stations, and reports the estimation result to the display unit 170 (step S37). Furthermore, the terminal 100 displays the terminal position estimation result on the display unit 170 (step S38).

As described above, according to the first embodiment, the transmission antenna gain and the attenuation rate in a space that is the transmission path are measured in an actual environment, so that positioning is performed accurately. Furthermore, in the first embodiment, the precision is increased by measuring a few points, and therefore it does not take time for prior studying, so that positioning is implemented efficiently and accurately.

Second Embodiment

Next, a description is given of a second embodiment. In the above-described first embodiment, when generating the fixed station correction information 332, the user holds the terminal 100 and receives actually measured RSSI values at points surrounding each fixed station. However, for example, when it is already known that a terminal is at a specific location, such a terminal is preferably used to automatically register fixed stations. Therefore, in the second embodiment, plural terminals around a fixed station are used to register fixed station correction information.

Figure 9:
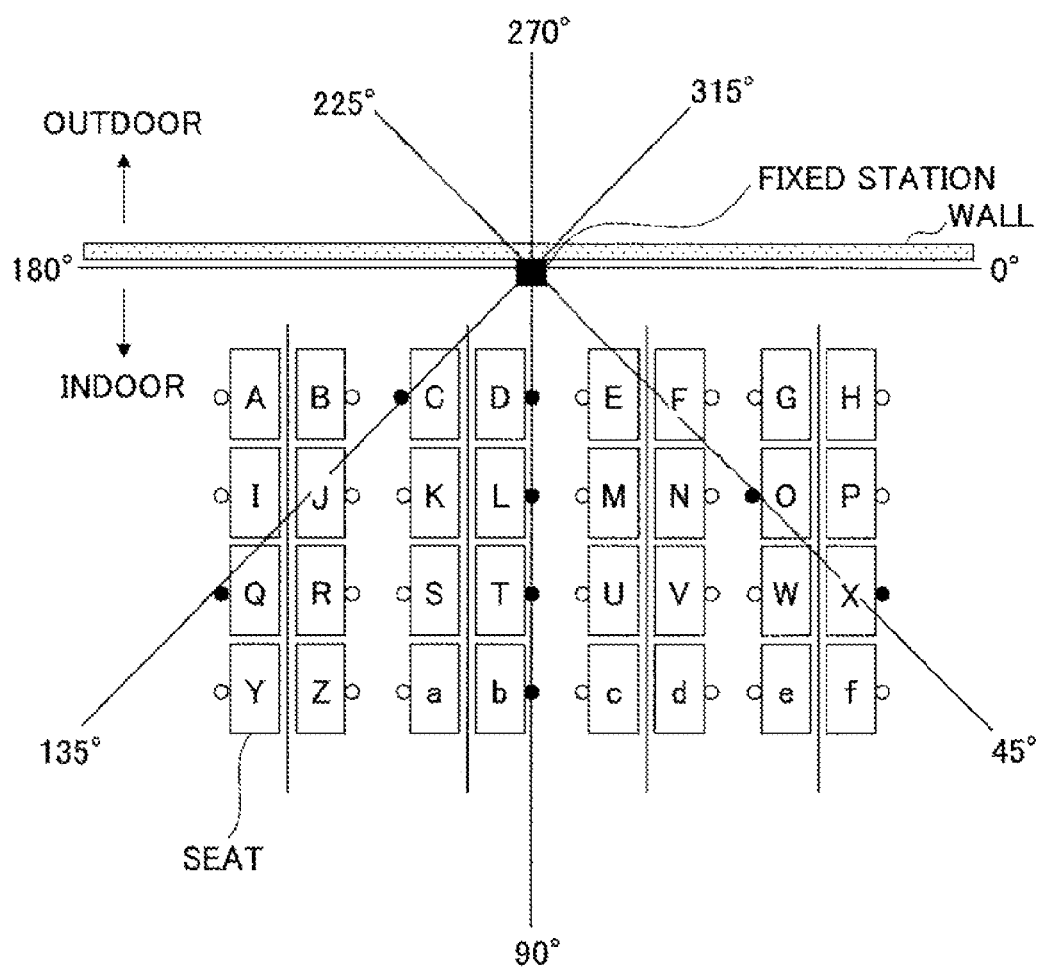
FIG. 9 schematically illustrates a registration process of fixed station correction information according to the second embodiment.

Overview of Registration Process of Fixed Station Correction Information According to Second Embodiment A detailed description is given of an overview of a registration process of fixed station correction information according to the second embodiment, with reference to FIG. 9. FIG. 9 schematically illustrates a registration process of fixed station correction information according to the second embodiment.

In the example of FIG. 9, there are plural seats (seats A through Z and seats a through f) provided at locations set in advance, on the inside of a wall of a room on which a fixed station is provided. It is assumed that predetermined people are to sit at these seats. Furthermore, it is assumed that the people are holding a terminal borrowed from their companies.

In this case, in the second embodiment, the distances and directions (angles) between the fixed station and the seats are registered in advance. Therefore, in the second embodiment, when users holding terminals are sitting at the seats, the RSSI from the fixed station is measured at the terminals at different locations (distances) along the respective directions, and the measured information is used to generate and register fixed station correction information at the management server.

Furthermore, in the example of FIG. 9, the RSSI from the fixed station is acquired with the use of terminals held by people sitting at seat O and seat X, in the direction at an angle 45° from the fixed station. Furthermore, in the example of FIG. 9, the RSSI from the fixed station is acquired with the use of at least two terminals among terminals held by people sitting at seats D, L, T, and b, in the direction at an angle 90° from the fixed station. Furthermore, in the example of FIG. 9, the RSSI is acquired with the use of terminals held by people sitting at seats C and Q, in the direction at an angle 135° from the fixed station.

In the second embodiment, terminal information (terminal ID) for identifying terminals held by people and seat (coordinate) information are associated with each other, so that the distance parameters (d) between the fixed station and the seats are acquired. Therefore, with the use of the distance parameter, it is possible to estimate parameters of the transmission antenna gain and the attenuation rate.

In the second embodiment, for example, the management server may hold absolute coordinates as the information of seats of people using terminals that may be used for creating the fixed station correction information, similar to the position of the fixed station. Furthermore, the management server may convert the positional relationships between the fixed station and the seats into information expressing the angle and the distance between the fixed station and the seats. Furthermore, the same device as that of the first embodiment may be used as the terminal. However, the device is not limited to a mobile terminal that may move together with the holder. The device may be a notebook computer set on each seat.

In the second embodiment, when RSSI values are acquired from three or more different locations (terminals) in the same direction, and two locations are to be selected, the two points closest to the fixed station may be selected. This is because if the distance from the fixed station is smaller, the communication is more stable, and therefore the RSSI may be acquired accurately and quickly. Furthermore, in another example, calculations may be performed for all combinations ($_nC_2$) of two points in plural locations and the average of the calculated values may be obtained, although not so limited.

Furthermore, in the second embodiment, information is set in advance, indicating whether to respond to a request to measure an RSSI value that is made from the management server to a terminal. When such a request is made, it is possible to determine whether to measure the RSSI value based on the set information.

Second Embodiment

System Configuration

Figure 10:
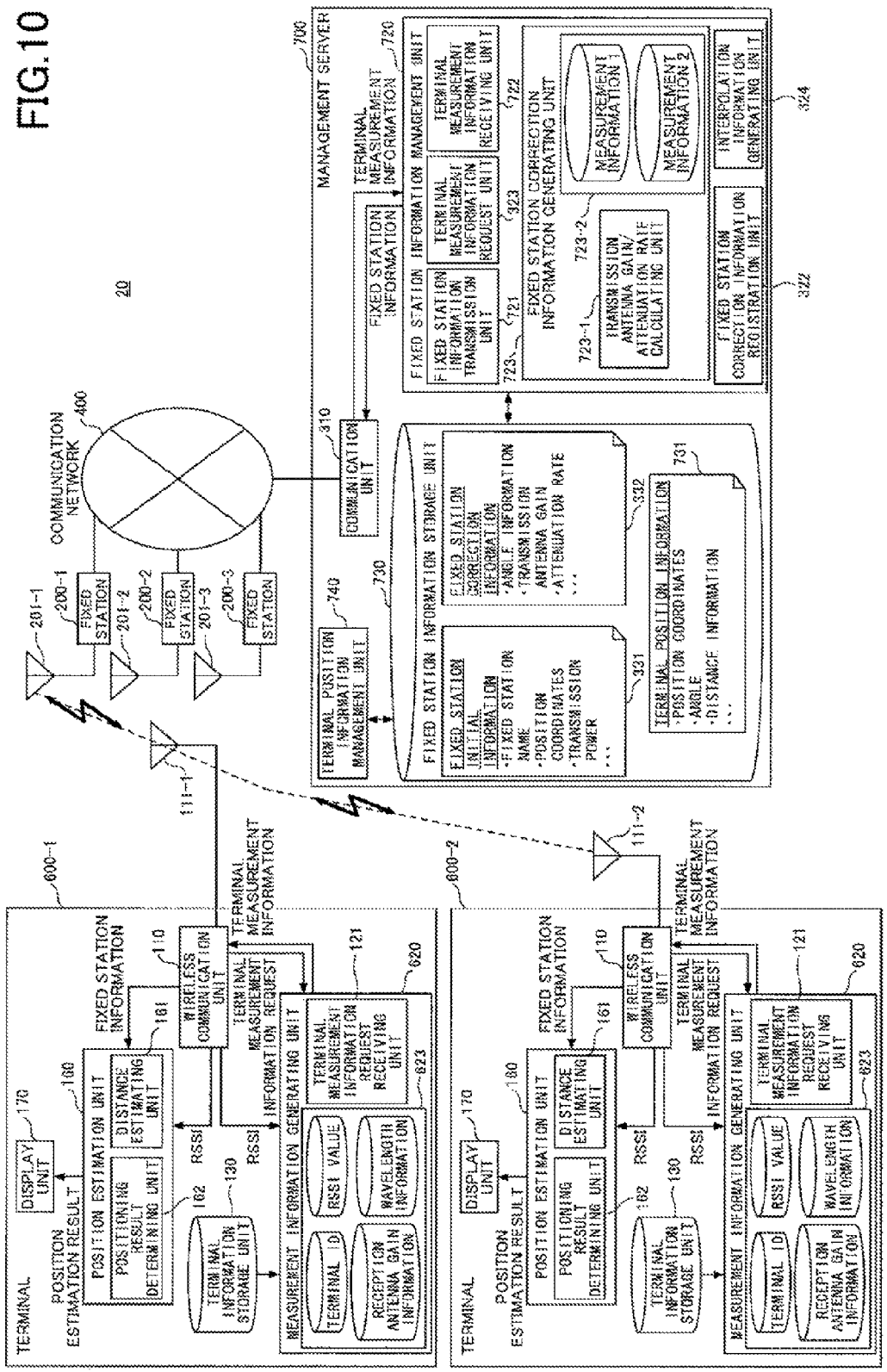
FIG. 10 schematically illustrates a positioning system according to the second embodiment.

Next, a description is given of a positioning system configuration according to the second embodiment, with reference to FIG. 10. FIG. 10 schematically illustrates a positioning system according to the second embodiment. In the following description, elements having the same functions as those of the first embodiment are denoted by the same reference numerals, and are not further described. Furthermore, in FIG. 10, the fixed station correction information is generated at the management server, although not limited thereto. The fixed station correction information may be created at the base station or the terminal.

A positioning system 20 of FIG. 10 includes terminals 600, one or more fixed stations 200 (three in FIG. 10), and a management server 700. The management server 700 and the fixed stations 200-1 through 200-3 are connected by the communication network 400, and data is exchanged. Meanwhile, the fixed stations 200-1 through 200-3 and the terminals 600 exchange data through radio waves via antennas. The present invention is not limited to the above contents, and other communication formats may be used.

The positioning system 20 of FIG. 10 uses plural terminals (in FIG. 10, terminals 600-1 and 600-2) located along a predetermined direction from the fixed station (in FIG. 10, in a predetermined direction from the antenna 201-1 of the fixed station 200-1) to acquire correction information for correcting an antenna gain pattern in the predetermined direction.

Second Embodiment

Terminal 600

A detailed description is given of the above-described terminal 600. The terminals 600-1 and 600-2 have the same configuration, and are thus collectively described. The terminal 600 includes the wireless communication unit 110, a measurement information generating unit 620, the terminal information storage unit 130, the position estimation unit 160, and the display unit 170.

The measurement information generating unit 620 includes the terminal measurement information request receiving unit 121 and a storage unit 623. The storage unit 623 stores a terminal ID, an RSSI value, reception antenna gain information, and wavelength information. That is to say, compared to the first embodiment, in the second embodiment, the RSSI from a predetermined fixed station (specific fixed station) only has to be acquired once at the respective locations of the terminals.

Furthermore, in the second embodiment, as illustrated in FIG. 10, the management server 300 acquires the measurement information obtained at the plural terminals 600-1 and 600-2, generates correction information for each fixed station, and stores the generated correction information. Therefore, in the storage unit 623 of the terminals 600-1 and 600-2, it is possible to omit the function of inputting distance information and angle information or to store the input distance information and angle information, which is included in the terminal 100 according to the first embodiment.

The terminal 600 acquires RSSI from a predetermined fixed station in response to a terminal measurement information request obtained from the wireless communication unit 110, and outputs, to the wireless communication unit 110, the acquired RSSI value and terminal measurement information including a terminal ID for identifying the terminal, wavelength information, and reception antenna gain information. The terminal information storage unit 130 stores information including various information items relevant to the terminal 600 (for example, reception antenna gain information, wireless standard (wavelength) information, identification information and machine type information, performance, user information, and setup information from a user. Accordingly, the terminal 600 may include at least one of these information items in the terminal measurement information and output the terminal measurement information.

The wireless communication unit 110 outputs the terminal measurement information attained by the measurement information generating unit 620 to the management server 700 via the fixed station 200.

In the terminal 600, the position estimation unit 160 includes the distance estimating unit 161 and the positioning result determining unit 162. The distance estimating unit 161 estimates the distances between the terminal 600 and the respective fixed stations 200-1 through 200-3, based on the fixed station information and RSSI obtained from the wireless communication unit 110. That is to say, the distance estimating unit 161 estimates the distance between the terminal 600 and the respective fixed stations 200-1 through 200-3, based on the RSSI values acquired from the fixed stations. At this time, in the second embodiment, similar to the first embodiment, the fixed station correction information may be acquired from the management server 700, and the acquired correction information may be used to estimate the distance. The positioning result determining unit 162 identifies the position of the terminal 600 with the intersection of distances from the fixed stations 200-1 through 200-3, based on the distances from the fixed stations 200-1 through 200-3 obtained by the distance estimating unit 161.

The display unit 170 displays the position estimation result obtained by the position estimation unit 160. The display unit 170 may have a sound output function, and may output the position estimation result by sound. Furthermore, the display unit 170 may output information other than the position estimation result. For example, the display unit 170 may display the setup information for executing the second embodiment and display the execution results and the execution progression.

Second Embodiment

Management server 700

Next, a detailed description is given of the management server 700 according to the second embodiment. The management server 700 includes the communication unit 310, a fixed station information management unit 720, a fixed station information storage unit 730, and a terminal position information management unit 740.

The communication unit 310 exchanges data with the fixed stations 200-1 through 200-3 via the communication network 400. The fixed station information management unit 720 includes a fixed station information transmission unit 721, the terminal measurement information request unit 323, a terminal measurement information receiving unit 722, a fixed station correction information generating unit 723, the fixed station correction information registration unit 322, and the interpolation information generating unit 324.

The fixed station information management unit 720 generates and registers fixed station correction information. The fixed station information management unit 720 extracts corresponding fixed station information from the fixed station information storage unit 730 in response to a reference request from the terminal 600, and returns the extracted fixed station information to the terminal 600 that made the request.

Specifically, for example, when positioning is performed at the terminal 600, the fixed station information transmission unit 721 acquires fixed station information of the corresponding fixed station from the fixed station information storage unit 730, and outputs the acquired fixed station information to the communication unit 310 to transmit the fixed station information to the terminal 600.

The terminal measurement information receiving unit 722 receives measurement information of each fixed station measured by the terminals 600-1 and 600-2. The measurement information is, for example, the terminal measurement information including the RSSI value, the terminal ID, the wavelength information, and the reception antenna gain information.

The fixed station correction information generating unit 723 includes a transmission antenna gain/attenuation rate calculating unit 723-1 and a measurement information storage unit 723-2. For example, the measurement information storage unit 723-2 may be stored in the fixed station information storage unit 730 instead of the fixed station information management unit 720.

The transmission antenna gain/attenuation rate calculating unit 723-1 calculates the transmission antenna gain and attenuation rate of the fixed station that is the measurement target using the above formula (1), based on RSSI values measured by the respective terminals 600 by using the known distance and angle information of each terminal. Furthermore, the transmission antenna gain/attenuation rate calculating unit 723-1 stores the calculated transmission antenna gain and attenuation rate as the fixed station correction information 332 in the fixed station information storage unit 730. In the second embodiment, the direction in which each terminal 600 is located with respect to the fixed station 200 is known, and therefore the fixed station correction information 332 may be registered in accordance with the corresponding angle information.

The fixed station information storage unit 730 includes the fixed station initial information 331, the fixed station correction information 332, and terminal position information 731. The terminal position information 731 is, for example, position coordinates and angle/distance information of the terminal.

The terminal position information management unit 740 manages the position information of the terminal from which the terminal measurement information is to be acquired. Specifically, the terminal position information management unit 740 converts the absolute coordinates of seat information into information indicating the angle and distance from each fixed station, and stores the converted information as the terminal position information 731 in the fixed station information storage unit 730. The terminal position information 731 may be, for example, the seat information (coordinates) illustrated in FIG. 9. Furthermore, in the second embodiment, the initial values at the time of installing the fixed station are saved, and are updated when the terminal collects the fixed station correction information.

The generation of the interpolation information according to the second embodiment is performed by the interpolation information generating unit 324, similar to the first embodiment.

Figure 11:
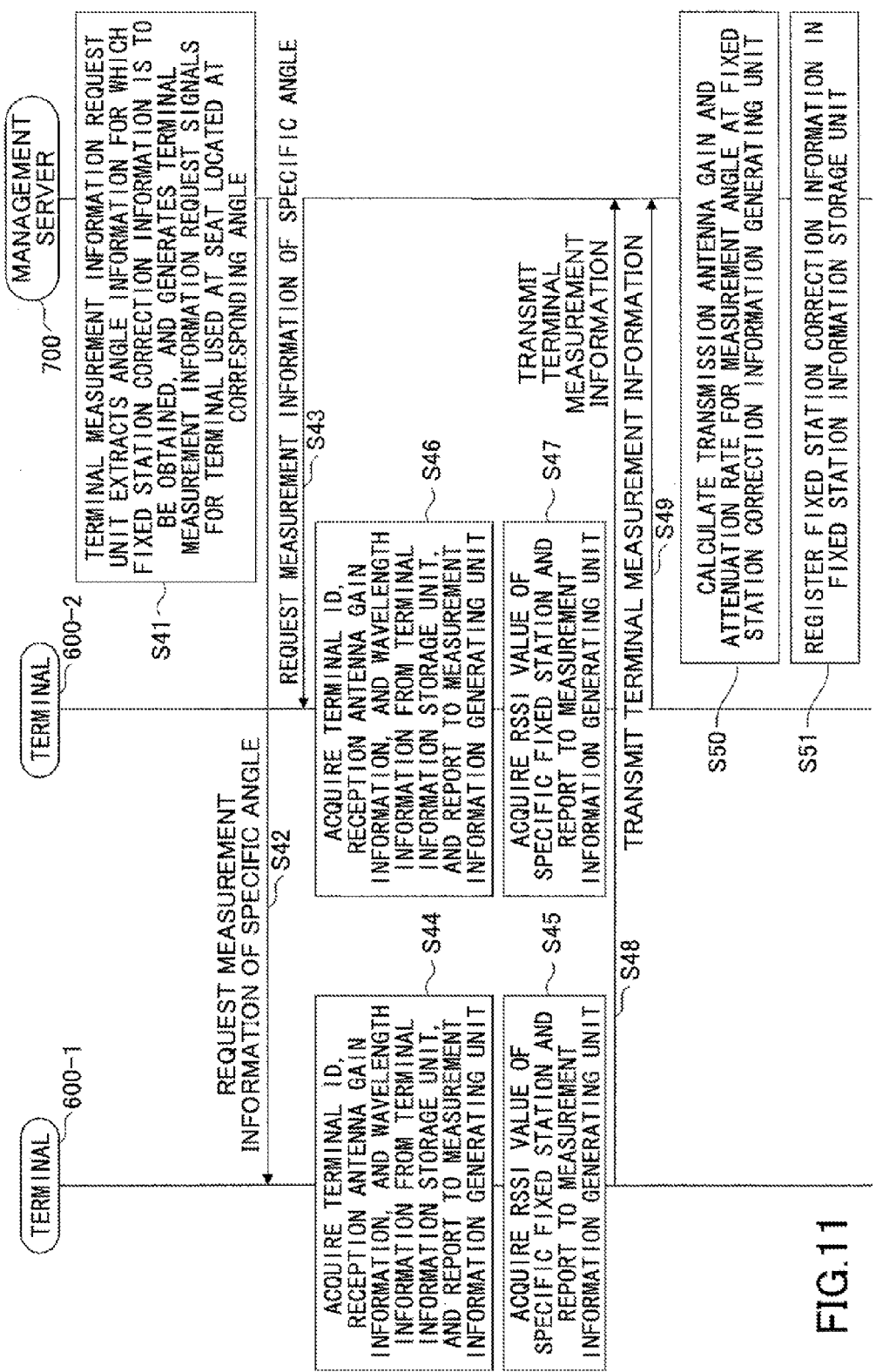
FIG. 11 is a sequence diagram indicating an example of generating the fixed station correction information according to the second embodiment.

In the second embodiment, the terminal measurement information request unit 323 is provided as an acquiring unit for receiving signals including identification information for identifying the fixed stations 200-1 through 200-3, measuring the RSSI of the received signals, and acquiring the position information indicating the measured positions, the RSSI, and the identification information in association with each other.
Example of Generating Fixed Station Correction Information According to Second Embodiment Next, a detailed description is given of an example of generating the above fixed station correction information according to the second embodiment with reference to a sequence diagram. FIG. 11 is a sequence diagram indicating an example of generating the fixed station correction information according to the second embodiment. In FIG. 11, terminals (for example, terminals 600-1 and 600-2) at plural locations along a predetermined direction from the fixed station and the management server 700 are provided; however, the number of terminals is not so limited. Furthermore, in the example of FIG. 11, it is assumed that the positions of the terminals at the plural locations are specified by the seats indicated in FIG. 9.

In FIG. 11, the terminal measurement information request unit 323 of the management server 700 extracts angle information for which fixed station correction information is to be obtained, and generates terminal measurement information request signals for a terminal used at a seat located at the corresponding angle (step S41). Next, the management server 700 sends a request to acquire measurement information of a specific angle extracted in step S41, to the terminal 600-1 (terminal 1) and the terminal 600-2 (terminal 2) (steps S42 and S43).

The terminal 600-1 receives the request for measurement information for the specific angle obtained from the management server 700 in step S42, acquires a terminal ID (terminal identification information), reception antenna gain information, and wavelength information from the terminal information storage unit 130, and reports the acquired information to the measurement information generating unit 620 (step S44). The terminal 600-1 acquires the RSSI value of the fixed station (specific fixed station) that is the measurement target by the wireless communication unit 110, and reports the acquired RSSI value to the measurement information generating unit 620 (step S45).

The terminal 600-2 receives the request for the measurement information for the specific angle obtained from the management server 700 in step S43, and similar to the terminal 600-1, acquires a terminal ID, reception antenna gain information, and wavelength information from the terminal information storage unit 130, and reports the acquired information to the measurement information generating unit 620 (step S46). The terminal 600-2 acquires an RSSI value of the specific fixed station, and reports the RSSI value to the measurement information generating unit 620 (step S47).

The terminal 600-1 transmits terminal measurement information including the information obtained in steps S44 and S45 to the management server 700 (step S48). Similarly, the terminal 600-2 transmits terminal measurement information including the information obtained in steps S46 and S47 to the management server 700 (step S49).

The management server 700 substitutes values in the formula (1) as in the first embodiment, based on the terminal measurement information obtained from the terminal 600-1 and the terminal 600-2, and calculates the transmission antenna gain and attenuation rate for the measurement angle at the fixed station correction information generating unit 723 (step S50). The management server 700 registers, in the fixed station information storage unit 730, the fixed station correction information 332 including the transmission antenna gain and attenuation rate obtained as the calculation result (step S51).

In steps S50 and S51, the management server 700 acquires, from the fixed station information storage unit 730, terminal position information (for example, position coordinates, and distance and angle (direction) from specific fixed station) 731, based on the terminal IDs in the terminal measurement information obtained from the terminal 600-1 and the terminal 600-2. Next, the fixed station correction information generating unit 723 of the management server 700 calculates the transmission antenna gain and attenuation rate for the angle by the above formula (1), with the use of the distance information included in the terminal position information and the terminal measurement information. Furthermore, the management server 700 registers the fixed station correction information 332 in the fixed station information storage unit 730 based on the above information.

In the second embodiment, the above process is performed for other directions selected in advance for the specific fixed station, and the directional patterns of antenna gains around the specific fixed stations are corrected.

In the second embodiment, different terminals measure the RSSI. Therefore, reception antenna gains are different according to the terminals. However, in the second embodiment, the reception antenna gain information that is set in advance for each terminal is transmitted to the management server 700 as terminal measurement information. Therefore, the values of the respective terminals may be substituted in the reception antenna gain of the above formula (1). Accordingly, the correction information is appropriately generated.

The reception antenna gain in the above embodiments may be a value that is set in advance. However, the reception antenna gain may change according to the direction of the terminal and the degree of contact with a human body (dielectric body). Therefore, in the above embodiments, the reception antenna gain may be adjusted according to the degree of contact. In this case, for example, the method described in Japanese Patent Application No. 2011-76195 filed by the applicant of the present application may be applied.

Specifically, the terminal includes a function of detecting contact information indicating the degree of contact with a dielectric body such as a human body using the terminal, and refers to a gain table recorded in advance in a recording unit based on the detected contact information, and extracts the reception antenna gain for correction. In the above embodiments, the reception antenna gain extracted in the above manner may be used to calculate the transmission antenna gain and attenuation rate.

The correction process described in the above embodiments (for example, the correction information generating process) may be implemented as a program to be executed by a computer. That is to say, a program for performing the correction process may be recorded in a recording medium, and a computer or a terminal may be caused to read the recording medium storing the program for implementing the above positioning correction process. Various types of recording media may be used, such as a recording medium for optically, electrically, or magnetically recording information such as a CD-ROM, a flexible disk, and a magneto-optical disc, and a semiconductor memory for electrically recording information such as a ROM and a flash memory. Furthermore, the correction process described in the above embodiments may be implemented in one or more integrated circuits.

Figure 12:
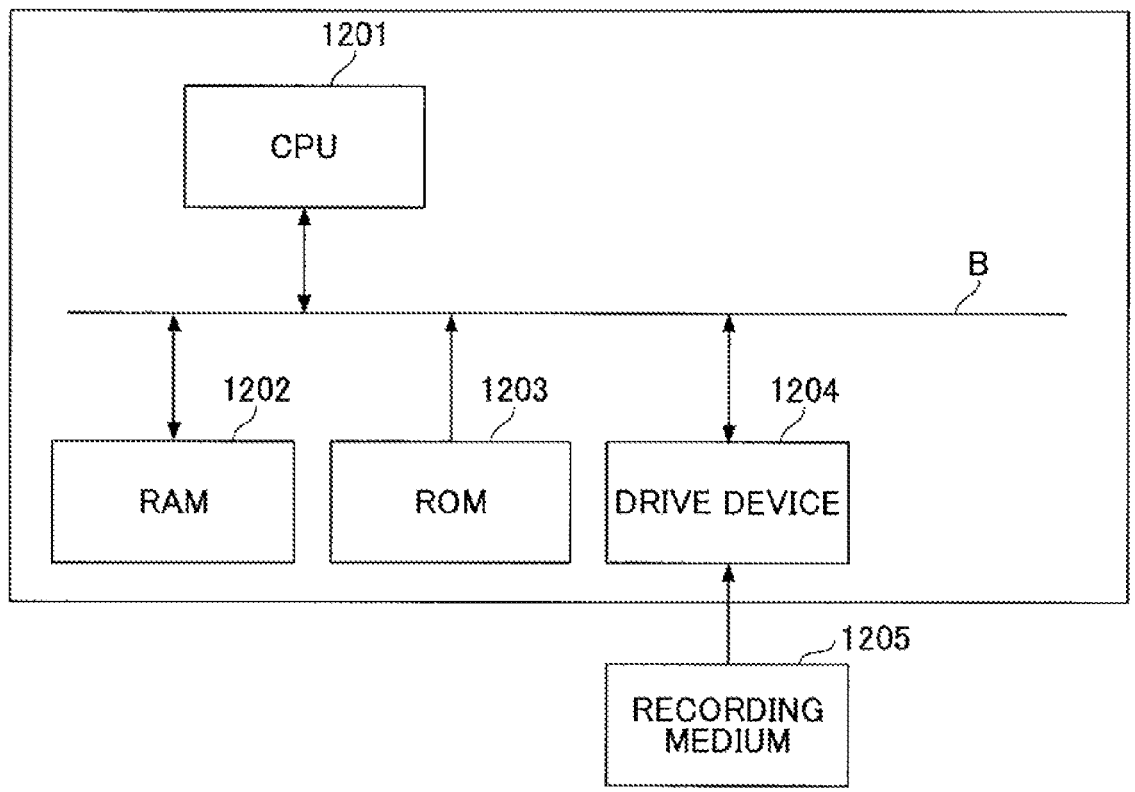
FIG. 12 schematically illustrates a hardware configuration of the management server.

FIG. 12 schematically illustrates a hardware configuration of the management server 300, 700. The management server 300, 700 includes a CPU (Central Processing Unit) 1201, a RAM (Random Access Memory) 1202, a ROM (Read Only Memory) 1203, and a drive device 1204, which are interconnected by a bus (B). The ROM 1203 stores programs executed when the management server 300, 700 is activated, as well as various data items. The RAM 1202 temporarily holds various programs and data items read from the ROM 1203. The CPU 1201 executes programs that are temporarily held by the RAM 1202. The programs executed by the CPU 1201 may be recorded in a recording medium 1205, and the programs recorded in the recording medium 1205 may be read into the RAM 1202 via the drive device 1204.

The above embodiments may be appropriately implemented in combination. Furthermore, in the above embodiments, the values of both the transmission antenna gain and attenuation rate are calculated. However, the present invention is not so limited, and either one value may be calculated and used for correction. In this case, a value set in advance is used for the value that is not calculated.

In the above embodiments, correction information for realizing appropriate positioning is efficiently acquired. Specifically, a positioning system includes a terminal with a wireless communication function and a management server managing information of fixed stations. In the positioning system, the RSSI is measured at plural locations of different distances from a fixed station, along a particular angle around the fixed station. Then, the transmission antenna gain of a fixed station and an attenuation rate of a section in a propagation path are calculated, and are stored in a server as fixed station correction information. Furthermore, in the above embodiments, when positioning a terminal, the distance between the terminal and a fixed station is calculated based on fixed station information to which RSSI received by the terminal from the fixed stations and fixed station correction information are attached. Accordingly, in the above embodiments, by measuring the transmission antenna gain of the fixed station and the attenuation rate of a space that is a propagation path in an actual environment, it is possible to perform positioning accurately. Furthermore, in the above embodiments, it is possible to increase the precision by measuring few points, and therefore it does not take time for prior studying.

According to an aspect of the present invention, it is possible to efficiently acquire correction information for implementing appropriate positioning.

The embodiments are not limited to the specific embodiments described herein, and variations and modifications may be made without departing from the scope of the claims.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
an acquiring unit configured to
receive signals, which are transmitted from a fixed station, including identification information for identifying the fixed station,
measure receive signal strength indications of the received signals, and
acquire position information indicating positions at which the receive signal strength indications are measured, the receive signal strength indications, and the identification information in association with each other; and
a gain/attenuation rate calculating unit configured to calculate correction information including a transmission antenna gain in a specific direction from the fixed station identified by the identification information and an attenuation rate in a propagation path, the correction information being obtained from the receive signal strength indication measured at a first distance in the specific direction from the fixed station identified by the identification information and the receive signal strength indication measured at a second distance in the specific direction that is different from the first distance, among the measured receive signal strength indications.

2. The information processing apparatus according to claim 1, wherein
the acquiring unit includes
a terminal measurement information requesting unit configured to cause a terminal device to measure a receive signal strength indication at a predetermined distance and a predetermined angle from the fixed station, wherein
the information processing apparatus includes
a correction information generating unit configured to generate correction information including a transmission antenna gain in a specific direction from the fixed station and an attenuation rate in a propagation path, based on the receive signal strength indication corresponding to a request made by the terminal measurement information requesting unit and distance information and angle information of the terminal device with respect to the fixed station,
a fixed station information storage unit configured to store the correction information generated by the correction information generating unit, and
a fixed station information management unit configured to extract, from the fixed station information storage unit, the correction information corresponding to the fixed station from which the receive signal strength indication is acquired, when positioning the terminal device, and to output the extracted correction information to the terminal device.

3. The information processing apparatus according to claim 1, further comprising:
an interpolation information generating unit configured to interpolate correction information for an angle for which correction information is not generated, with the use of correction information that has already been generated.

4. The information processing apparatus according to claim 3, wherein
when correction information of two angles that have already been acquired is used for the interpolation, a difference between the correction information of the two angles is compared with a threshold set in advance, and based on the comparison result, it is determined whether to interpolate correction information for the angle for which correction information is not generated.

5. The information processing apparatus according to claim 1, wherein
the acquiring unit includes a wireless communication unit configured to receive the signals transmitted from the fixed station, wherein
the information processing apparatus includes a terminal measurement information request receiving unit configured to identify a terminal measurement information request from the signals received by the wireless communication unit, wherein
the wireless communication unit transmits the calculated correction information to a request source that requested the terminal measurement information request.

6. A correction method comprising:
receiving signals, which are transmitted from a fixed station, including identification information for identifying the fixed station;
measuring receive signal strength indications of the received signals;
acquiring position information indicating positions at which the receive signal strength indications are measured, the receive signal strength indications, and the identification information in association with each other; and
calculating correction information including a transmission antenna gain in a specific direction from the fixed station identified by the identification information and an attenuation rate in a propagation path, the correction information being obtained from the receive signal strength indication measured at a first distance in the specific direction from the fixed station identified by the identification information and the receive signal strength indication measured at a second distance in the specific direction that is different from the first distance, among the measured receive signal strength indications.

7. A non-transitory computer-readable recording medium storing a program for causing a computer to execute a method comprising:
receiving signals, which are transmitted from a fixed station, including identification information for identifying the fixed station;
measuring receive signal strength indications of the received signals;
acquiring position information indicating positions at which the receive signal strength indications are measured, the receive signal strength indications, and the identification information in association with each other; and
calculating correction information including a transmission antenna gain in a specific direction from the fixed station identified by the identification information and an attenuation rate in a propagation path, the correction information being obtained from the receive signal strength indication measured at a first distance in the specific direction from the fixed station identified by the identification information and the receive signal strength indication measured at a second distance in the specific direction that is different from the first distance, among the measured receive signal strength indications.

* * * * *